(12) United States Patent
Mallard

(10) Patent No.: US 10,641,312 B2
(45) Date of Patent: May 5, 2020

(54) GASKET ASSEMBLY

(71) Applicant: Ford Motor Company Limited, Brentwood (GB)

(72) Inventor: William Mallard, Southend on Sea (GB)

(73) Assignee: Ford Global Technologies, LLC, Dearborn, MI (US)

( * ) Notice: Subject to any disclaimer, the term of this patent is extended or adjusted under 35 U.S.C. 154(b) by 49 days.

(21) Appl. No.: 15/917,228

(22) Filed: Mar. 9, 2018

(65) Prior Publication Data
US 2018/0291946 A1 Oct. 11, 2018

(30) Foreign Application Priority Data

Apr. 7, 2017 (GB) .................................. 1705614.4

(51) Int. Cl.
| | | |
|---|---|---|
| F16J 15/06 | (2006.01) |
| F16B 33/00 | (2006.01) |
| F16J 15/08 | (2006.01) |
| F16J 15/10 | (2006.01) |
| F16B 43/00 | (2006.01) |
| F16J 15/02 | (2006.01) |

(52) U.S. Cl.
CPC ........... *F16B 33/004* (2013.01); *F16J 15/061* (2013.01); *F16J 15/068* (2013.01); *F16J 15/0818* (2013.01); *F16J 15/104* (2013.01); *F16B 43/001* (2013.01); *F16J 15/025* (2013.01)

(58) Field of Classification Search
CPC ...... F16J 15/061; F16J 15/068; F16J 15/0818; F16J 15/104; F16J 15/025; F16B 33/004; F16B 43/001
See application file for complete search history.

(56) References Cited

U.S. PATENT DOCUMENTS

| | | |
|---|---|---|
| 4,784,396 A | 11/1988 | Scott et al. |
| 5,505,466 A | 4/1996 | Willis et al. |

(Continued)

FOREIGN PATENT DOCUMENTS

| | | |
|---|---|---|
| AU | 2007201648 A1 | 11/2008 |
| DE | 102012107539 A1 | 2/2014 |

(Continued)

OTHER PUBLICATIONS

Great Britain Intellectual Property Office, Combined Search and Examination Report Issued in Application No. GB1705614.4, dated Sep. 22, 2017, 5 pages.

(Continued)

*Primary Examiner* — Gilbert Y Lee
(74) *Attorney, Agent, or Firm* — Geoffrey Brumbaugh; McCoy Russell LLP

(57) ABSTRACT

A seal assembly for an assembly of a vehicle is provided. The seal assembly comprises a seal configured to create a seal between first and second components of the vehicle assembly and a retaining element configured to couple the seal to the first component prior to assembly of the vehicle assembly, wherein at least a portion of the retaining element is deformable and is configured to deform from a first state to a second state during installation or use of the seal assembly, such that after said deformation the retaining element no longer couples the seal to the first component.

17 Claims, 5 Drawing Sheets

(56) References Cited

U.S. PATENT DOCUMENTS

| | | | |
|---|---|---|---|
| 5,681,064 A | 10/1997 | Aldridge et al. | |
| 5,735,533 A | 4/1998 | Nolan et al. | |
| 5,890,719 A | 4/1999 | Bettencourt | |
| 5,984,318 A | 11/1999 | Kojima et al. | |
| 6,390,512 B1 | 5/2002 | Corbett | |
| 6,652,231 B2 * | 11/2003 | Vedantam | F01D 11/005 |
| | | | 277/637 |
| 8,632,073 B2 * | 1/2014 | Sanderson | F16J 13/065 |
| | | | 277/312 |
| 2003/0133793 A1 | 7/2003 | Vedantam et al. | |

FOREIGN PATENT DOCUMENTS

| | | |
|---|---|---|
| GB | 2536471 A | 9/2016 |
| WO | 2011023425 A1 | 3/2011 |

OTHER PUBLICATIONS

European Patent Office, Extended European Search Report Issued in Application No. 18154515.3, dated Aug. 1, 2018, Germany, 6 pages.

* cited by examiner

GASKET ASSEMBLY

CROSS REFERENCE TO RELATED APPLICATION

The present application claims priority to Great Britain Patent Application No. 1705614.4, filed Apr. 7, 2017. The entire contents of the above-referenced application are hereby incorporated by reference in its entirety for all purposes.

TECHNICAL FIELD

The present disclosure relates to a gasket assembly for a vehicle and is particularly, although not exclusively, concerned with a gasket assembly configured to improve maintenance of a vehicle assembly comprising a gasket.

BACKGROUND

Many assemblies within a motor vehicle comprise gaskets that are provided to improve sealing between components of the assembly. For example, the gasket may be provided in order to reduce or prevent oil leakage between the components of the assembly. Providing a gasket within the assembly increases the number of components within the vehicle and may increase the number of separate components that must be stored and assembled on the vehicle production line.

In order to improve the process of assembling an assembly for a vehicle comprising a gasket, the gasket may be coupled to a component of the vehicle assembly away from the main vehicle production line. A subassembly comprising the vehicle component and the gasket may be transported to the vehicle production line for assembly onto the vehicle.

In order to prevent the gasket from becoming separated from the vehicle component during transport, the gasket may comprise a retaining feature configured to couple the gasket to the component of the vehicle assembly.

When maintenance is performed on the assembly comprising the gasket, it is often desirable to replace the gasket. However, when the gasket comprises the retaining feature, the process of removing and replacing the gasket may be challenging. In some cases, it may be necessary to replace the component of the vehicle assembly in order to replace the gasket.

STATEMENTS OF INVENTION

According to an aspect of the present disclosure, there is provided a seal assembly, such as a gasket assembly, for an assembly of a vehicle, the seal assembly comprising: a seal, e.g. a gasket, configured to create a seal between first and second components of the vehicle assembly; and a retaining element configured to couple the seal to the first component prior to assembly of the vehicle assembly, wherein at least a portion of the retaining element is deformable, e.g. permanently deformable, and is configured to deform from a first state to a second state during installation or intended use of the seal assembly, such that after said deformation the retaining element no longer couples the seal to the first component.

The terms deform and deformable used within the specification are intended to encompass any process by which the retaining member or a portion of the retaining member changes its shape or form. For example, deforming may include, melting, subliming, breaking, e.g. fracturing or shattering, decomposing, e.g. thermally decomposing, oxidizing, plastically deforming and/or any other form of deformation.

The retaining element or portion thereof may be configured to deform from the first state to the second state due to the operating environment, e.g. temperature, of the seal assembly, e.g. when the temperature reaches a threshold value, for example, the intended operating temperature of the seal assembly.

The retaining element or portion thereof may be configured to at least partially melt under the operating conditions of the seal assembly. The retaining element of portion thereof may have a melting point less than or equal an intended operating temperature of the seal assembly. For example, the retaining element of portion thereof may have a melting temperature lower than 250 degrees Celsius or lower than 70 degrees Celsius or lower than 60 degrees Celsius. The retaining element of portion thereof may be made from a polymer material or a wax material.

Additionally or alternatively, the retaining element or portion thereof may be frangible and may be configured to break when the seal assembly is installed into the vehicle assembly. For example, the retaining element or portion thereof may break as the seal is created by the seal, e.g. when it is clamped together by first and second components to create the seal. Alternatively, the retaining element or portion thereof may break due to an operating condition of the seal assembly, e.g. a force or vibration experience by the seal assembly during operation.

The retaining element may be configured to be at least partially received within a bore formed in the first component. The retaining element may be configured to extend through the bore defined in the first component, e.g. from a first side to a second side of the first component.

The seal may define a seal aperture configured to receive a fastener for coupling the first component to the second component. The retaining element may extend through the seal aperture.

The retaining element may define a retainer aperture configured to receive a fastener, e.g. the fastener for coupling the first component to the second component. The retainer aperture may be aligned with the seal aperture.

The retaining element may further comprise a grip member. The grip member may be configured to couple to the fastener received within the retainer aperture. The grip member may provide resistance against the removal of the fastener from the retainer aperture. The grip member may comprise one or more resilient grip elements configured to deform in order to allow the fastener to be inserted through the aperture. The resilient grip members may be configured to grip the fastener to couple the fastener to the grip member.

At least a portion of the grip member may be configured to deform, e.g. permanently deform, between a first state and a second state by virtue of the operating condition of the seal assembly such that the fastener may be removed from the retainer aperture when the further grip member or portion thereof is in the second state. The grip member or portion thereof may be configured to deform under substantially the same conditions as the retaining element of portion thereof. Alternatively, the grip member may be configured to deform under difference conditions to the retaining member.

The retaining element may be integral with or may be separate from the seal. The retaining element may comprise a first flange, a second flange and a body portion extending between the first and second flanges. The body portion of the retaining element may be configured to extend through a bore of the first component such that the first flange is arranged on a first side of the bore, and the second flange is arranged on a second side of the bore. The body portion may extend through the seal body. In other words, the first flange may be arranged to a first side of the seal body and the second flange may be arranged to a second side of the seal body.

The first flange and/or the body portion may be flexible, e.g. in order to permit the first flange and body portion to be inserted into the bore of the first component. The first flange and/or the body portion may comprise a plurality of slits configured to allow the diameter of the first flange be reduced, e.g. in order to assemble the retaining element into the opening or through the bore of the first component.

According to another aspect of the present disclosure, there is provided a seal assembly for an assembly of a vehicle, the seal assembly comprising: a seal configured to create a seal between first and second components of the vehicle assembly; and a retaining element configured to couple the seal to the first component prior to assembly of the vehicle assembly, wherein the retaining element comprises a deformable portion configured to deform from a first state to a second state by virtue of the operating environment of the seal assembly, such that the seal is no longer coupled to the first component when the deformable portion is in the second state.

The retaining element may consist of the deformable portion. In other words, the whole of the retaining element may be deformable or a portion of the retaining element may be deformable.

According to another aspect of the present disclosure, there is provided a vehicle assembly comprising: a first component; and a seal assembly according to any of the preceding claims.

The first component may comprise a counter-bore. The first flange of the retaining element may be at least partially received within the counter-bore. The first flange may be substantially completely received within the counter-bore of the first component.

The seal may be arranged between the second flange of the retaining element and the first component. The first component may be arranged between the seal and the first flange.

The vehicle assembly may further comprise a fastener configured to couple the first component to a second component of the vehicle assembly. A head of the fastener may have a larger diameter than the first flange of the retaining element, e.g. such that the head of the fastener extends over the counter-bore of the first component. In other words, the first flange and the counter-bore may be configured so as not to affect the operation of the fastener.

The fastener may comprise a shank having a mid portion and a distal portion. The mid portion may have a smaller diameter than the distal portion. The mid portion and the distal portion may be separated by a shoulder. The retaining member, e.g. the grip member, may act against the shoulder in order to provide resistance against the removal of the fastener.

The first component may comprise a drain channel configured to allow a melted portion of the retaining element to drain away from the seal. The first component may comprise a chamber. The chamber may be configured such a melted portion of the retaining element may be received within the chamber. Alternatively, the drain channel may extend through the first component to allow the melted portion of the retaining element to drain out of the first component.

The first component may comprise a bore configured to receive a fastener to couple the first component to a second component of the vehicle assembly. The retaining element may be at least partially received within the bore.

The grip member may be couplable to the fastener by inserting a shank of the fastener through the bore such that the grip member engages the shoulder of the fastener shank. For example, the grip member may comprise one or more resilient grip elements configured to deform in order to allow the fastener to be inserted through the aperture, the resilient grip members configured spring back and grip the fastener to couple the fastener to the grip member.

The vehicle assembly may further comprise the second component. The second component may comprise a bore configured to receive a fastener to couple the first component to the second component. The second component may comprise a counter-bore configured to receive a portion of the retaining element, e.g. the second flange of the retaining element may be at least partially received within the counter-bore of the second component.

The second component may comprise a drain channel configured to allow a melted portion of the retaining element to drain away from the seal.

According to another aspect of the present disclosure, there is provided a method for a seal, such as a gasket for an assembly of a vehicle, wherein the vehicle assembly comprises a first component, a second component and a seal assembly, the seal assembly comprising: the seal configured to create a seal between the first component and the second component of the vehicle assembly; and a retaining element configured to couple the seal to the first component prior to assembly of the vehicle assembly, wherein at least a portion of the retaining element is deformable and is configured to deform from a first state to a second state during installation or use of the seal assembly, such that after said deformation the seal is no longer coupled to the first component, wherein the method comprises: installing or using the seal within the vehicle assembly such that the retaining element or portion thereof deforms from the first state to the second state.

The method may further comprise replacing the seal assembly with a replacement seal, wherein the replacement seal does not comprise a retaining element.

According to another aspect of the present disclosure, there is provided a method for a seal, such as a gasket, for an assembly of a vehicle, wherein the vehicle assembly comprises a first component, a second component and a seal assembly, e.g. a gasket assembly, the seal assembly comprising: the seal configured to create a seal between the first component and the second component of the vehicle assembly; and a retaining element configured to couple the seal to the first component prior to assembly of the vehicle assembly, wherein at least a portion of the retaining element is deformable and is configured to deform from a first state to a second state by virtue of the operating environment of the seal assembly, such that after said deformation the seal is no longer coupled to the first component, wherein the method comprises: operating the vehicle assembly such that the seal assembly reaches a predetermined operating condition and the retaining element is deformed from the first state to the second state.

According to another aspect of the present disclosure, there is provided a method for manufacturing a seal assembly, such as a gasket assembly, for an assembly of a vehicle, wherein the seal assembly comprises a seal, e.g. a gasket, configured to create a seal between first and second components of the vehicle assembly; and a retaining element configured to couple the seal to the first component prior to assembly of the vehicle assembly, wherein the method comprises: determining an intended operating condition of the seal assembly, manufacturing the retaining element such that at least a portion of the retaining element is configured to deform from a first state to a second state by virtue of the intended operating condition of the seal assembly, such that after said deformation the retaining element no longer couples the seal to the first component.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

BRIEF DESCRIPTION OF THE DRAWINGS

For a better understanding of the present disclosure, and to show more clearly how it may be carried into effect, reference will now be made, by way of example, to the accompanying drawings, in which:

FIGS. 1A-6 are drawn to scale, although other relative dimensions may be used, if desired.

DETAILED DESCRIPTION

Figure 1A:
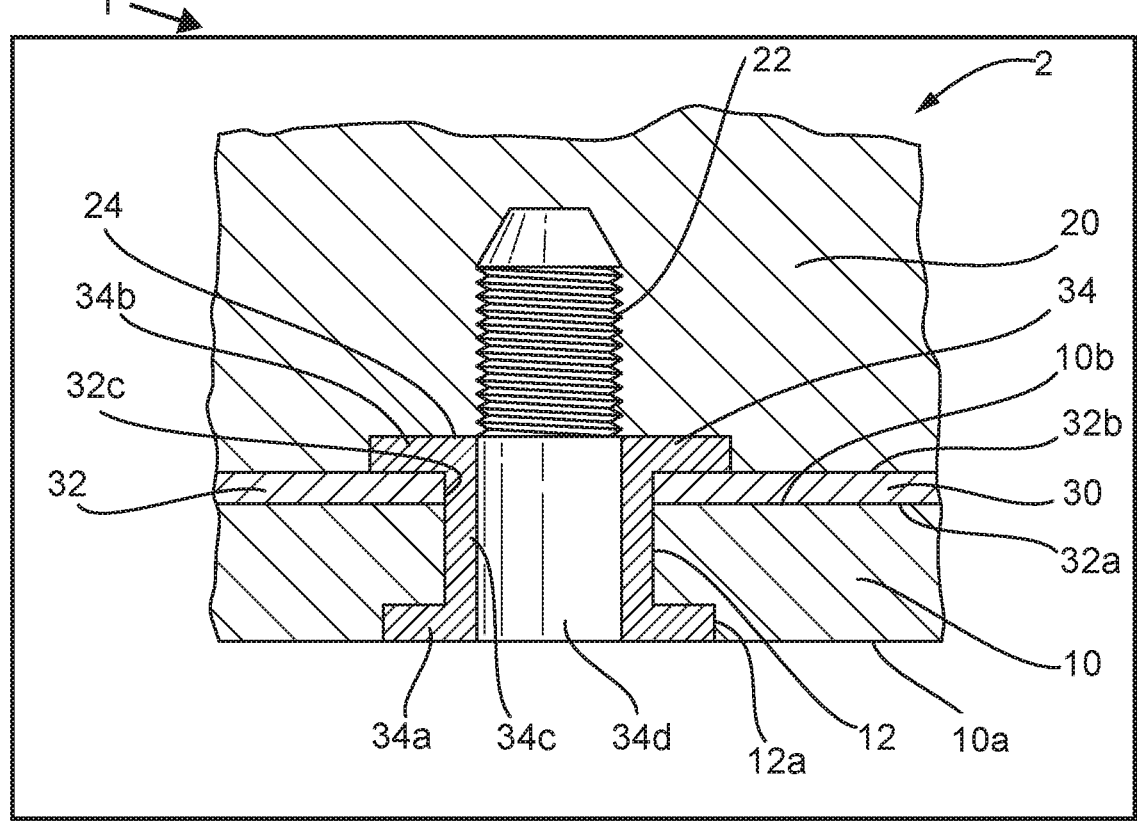
FIGS. 1A, 1B and 1C are a partial cross-sectional views of a vehicle assembly, according to arrangements of the present disclosure.

With reference to FIG. 1A, an assembly 2 for a vehicle 1, such as a wheeled motor vehicle for travel on a road, comprises a first component 10, a second component 20 and a seal assembly, such as gasket assembly 30, configured to create a seal between the first and second components 10, 20.

The gasket assembly 30 comprises a gasket body 32, configured to be clamped between the first and second components 10, 20 to create the seal, and a retaining element 34. The retaining element is configured to couple the gasket body 32 to the first component 10 of the vehicle assembly such that the gasket assembly 30 remains connected to the first component 10 prior to assembly of the vehicle assembly, e.g. on the vehicle production line.

With reference to FIGS. 1A to 1C and FIG. 2, the retaining element 34 may comprise a first flange 34a, a second flange 34b and a body portion 34c extending between the first and second flanges. In the arrangement shown, the body portion is substantially tubular and the first and second flanges extend radially outward from an outer surface of the body portion 34c around the perimeter of the body portion 34c. In other arrangements, the first and/or second flanges may extend from the outer surface of the body portion 34c in a direction with a component in the direction of a central axis of the body portion 34c. In the arrangement shown, the body portion 34c may be cylindrical, but other shapes are also envisaged.

The body portion 34c may extend through a gasket aperture 32c defined in the gasket body 32. The retaining element 34 may be arranged such that the first flange 34a faces a first side 32a of the gasket body 32 and the second flange 34b faces, e.g. abuts a second side 32b of the gasket body.

The first component 10 comprises a bore 12. As depicted in FIG. 1A, the bore 12 extends from a first side 10a of the first component to a second side 10b of the first component. The body portion 34b extends through the bore 12. The first flange 34a is thereby arranged on, e.g. faces, a first side 10a of the first component and the second flange 34b is arranged on, e.g. faces, a second side 10b of the first component. The gasket body 32 is retained between the second flange 34b and the first component 10.

In other arrangements of the disclosure, the bore 12 may be a blind bore, the body portion 34c and/or the first flange 34a may be received within the bore. The retaining element 34 may couple to the first component 10 at the bore. For example, friction between the body portion 34c and/or the first flange 34a may prevent the retaining element 34 from being removed from the bore. In some arrangements, the first flange 34a may be omitted. Additionally or alternatively, the bore 12 may comprise a shoulder formed within the bore and the first flange 34a may be configured to abut the shoulder of the first component 10 such that removal of the retaining element 34 from the bore is restricted.

Figure 2:
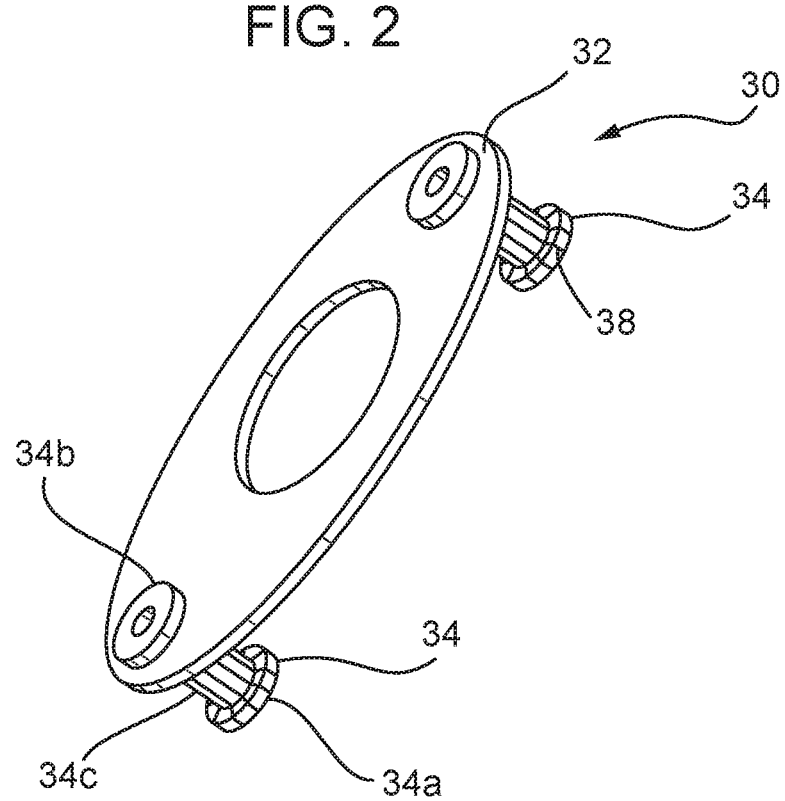
FIG. 2 is a perspective view of a gasket assembly for a vehicle assembly, according to arrangements of the present disclosure

The first flange 34a and/or the body portion 34c may be flexible. This may allow the diameter of the first flange and optionally the body portion 34c to be reduced in order for the first flange and body portion to be inserted into the bore 12 formed in the first component 10. Additionally or alternatively, as depicted in FIG. 2, the first flange 34a and/or the body portion 34c may comprise a plurality of slits 38. When the first flange 34a and the body portion 34c are inserted into the opening or bore 12, the slits 38 may be compressed in order to reduce the diameter of the first flange 34a and/or body portion 34c.

As shown in FIG. 2, the gasket assembly 30 may comprise a plurality of retaining elements 34 configured to couple the gasket assembly 30 to the first component 10. For example, the gasket assembly 30 may comprise two, three or more than three retaining elements 34. Each of the retaining elements may be received within an opening or bore of the first component.

Figure 1B:
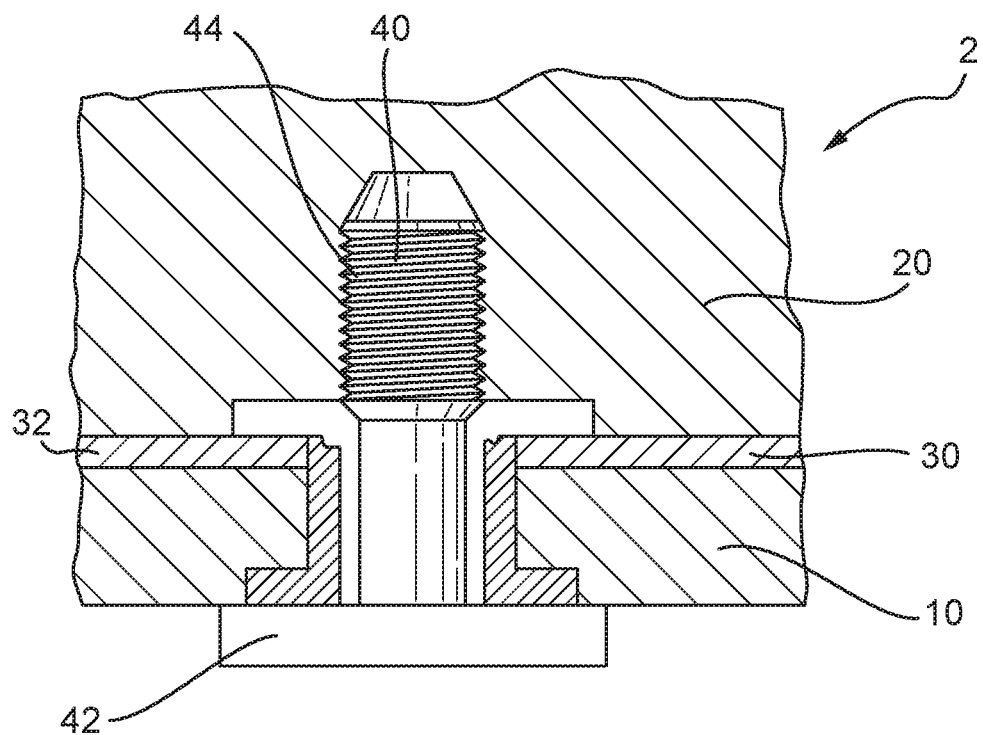
Figure 1C:
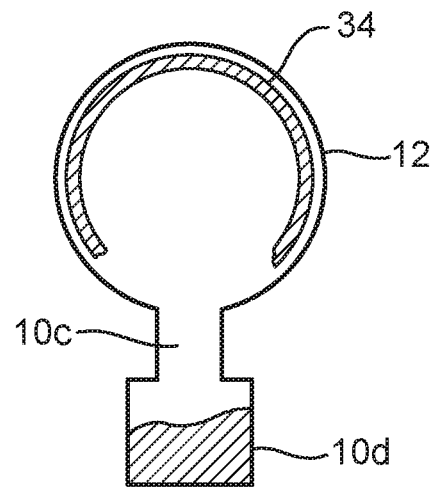

With reference to FIGS. 1B and 1C, the bore 12 may be configured to receive a fastener 40 to couple together the first and second components 10, 20. The fastener 40 may comprise a head 42 and a shank 44. The gasket aperture 32c may be configured to align with the bore 12, such that the fastener shank 44 passes through the gasket aperture 32c. Hence, the seal created by the gasket assembly 30 may extend around the fastener 40. The body portion 34c may define a retainer bore 34d. The retainer bore 34d may be aligned with the bore 12 defined in the first component and with the gasket aperture 32c. When the first component is coupled to the second component, the fastener shank 44 may be passed through the retainer bore 34d.

As depicted in FIG. 1A, a counter-bore 12a may be provided at the bore 12 on the first side 10a of the first component to accommodate the first flange 34a. The counter-bore 12a may define a shoulder and the first flange 34a may be arranged to abut the shoulder such that removal of the retaining element 34 from the bore is prevented. As shown in FIG. 1A, the bottom of the counter-bore may be flat, e.g. in a plane perpendicular to a central axis of the bore. However, it is equally envisaged that the bottom of the counter-bore may not be flat. For example, the bottom of the counter-bore may be angled or curved.

The first flange 34a may be at least partially received within the counter-bore 12a. As shown in FIG. 1A, the first flange 34a may be completely received within the counter-bore 12a such that the first flange does not protrude out of the counter-bore 12a, e.g. beyond a surface of the first component 10 on its first side. For example, a thickness of the first flange 34a may be less than or equal to a depth of the counter-bore 12. When the fastener 40 is installed, the head 42 of the fastener may abut the first component 10 at the first side 10a. By configuring the first flange 34a and/or the counter-bore 12a such that the first flange does not protrude out of the counter-bore 12a, the first flange 34a may not interfere with the installation of the fastener 40. Additionally, by configuring the first flange 34a and/or the counter-bore 12a in this way, the fastener may not apply a load to the retaining element 34 when the first component 10 is coupled to the second component 12.

The second component 20 may comprise a bore 22 configured to receive the fastener 40. At least a portion of the bore 22 may be threaded. A distal end of the fastener shank 44 may be received in the bore 22 and may be threaded into the threaded portion in order to couple the first component 10 to the second component 20. When the vehicle assembly 2 is assembled, the bore 22 may be aligned with the bore 12 of the first component, the gasket bore 32c and the retainer bore 36d.

The second component 20 may further comprise a counter-bore 24 provided at an opening of the bore 22. The second flange 32b may be at least partially received within the counter-bore. In the arrangement shown in FIG. 1A, the counter-bore 24 and the second flange 32b are configured such that a thickness of the second flange 32b is less than or equal to a depth of the counter-bore 24. Hence, when the vehicle assembly 2 is assembled, and the gasket body 32 is clamped between the first and second components 10, 20 to create the seal, the second flange 32b may be completely received within the counter-bore 24 and the second flange 32b may not interfere with the second component 20 or the gasket body 32.

At least a portion of the retaining element 34 is deformable. For example, the retaining element 34 may comprise a deformable portion. The deformable portion may be configured to deform, e.g. permanently deform. In particular, the deformable portion may be configured to deform from a first state, as depicted in FIG. 1A, to a second state, as depicted in FIG. 1B. In the first state, the retaining member 34 is configured to couple the gasket body 32 to the first component 10 as described above. In the second state, the retaining element 34 may not couple the gasket assembly 30 to the first component 10.

As depicted in FIG. 1B, the deformable portion may comprise the second flange 34b. Additionally or alternatively, the deformable portion may comprise at least a portion of the body portion 34c and/or the first flange 34a. For example, the deformable portion may comprise a portion of the body portion 34c adjacent to the first and/or second flange, such that when the deformable portion deforms the first and/or second flanges become disconnected from the body portion 34c.

In some arrangements, the retaining element 34 or the deformable portion of the retaining element 34 may be configured to deform from the first state to the second state by virtue of on operating condition of the gasket assembly 30. The deformable portion may deform due to the operating temperature of the gasket assembly 30, e.g. the operating temperature of the vehicle assembly 2 in which the gasket assembly 30 is installed. For example, the deformable portion may melt, sublime, evaporate, oxidize and/or decompose, e.g. thermally decompose, due to the operating temperature of the gasket assembly 2.

The retaining element 34 or deformable portion of the retaining element 34 may be manufactured from a material having a melting, sublimation, evaporation, oxidation and/or decomposition temperature that is less that the operating temperature of the gasket assembly. For example, the retaining member 34, or deformable portion may be manufactured from a polymer material, such as Nylon or polycaprolacone, a wax material, or any other suitable material.

With reference to FIG. 1C, the first component may comprise a drain channel 10c and/or a chamber 10d. The drain channel 10c may be configured to allow the melted deformable portion to drain away from the gasket assembly 30. As depicted in FIG. 1C, the first component 10 further comprises a chamber 10d configured to receive the melted deformable portion, such that the deformable portion may be retained by the first component 10. The melted deformable portion may flow through the drain channel and into the chamber 10d. In alternative arrangements, the chamber 10d may be omitted and the drain channel 10c may extend through the first component 10 such that the deformable portion is able to drain away out of the first component 10. In another alternative arrangement, the drain channel 10c may be omitted and the deformable portion may drain directly into the chamber 10d.

In an alternative arrangement, the retaining element 34 or the deformable portion of the retaining element 34 may be frangible, e.g. breakable, and may be configured to fracture or shatter during operation of the vehicle assembly 2, such that the retaining element 34 no longer couples the gasket assembly 30 to the first component 10 following operation of the vehicle assembly 2. For example, the deformable portion may be configured to break due to vibrations of the gasket assembly 30 during operation of the vehicle assembly 2.

In other arrangements, the deformable portion may be configured to deform during assembly of the vehicle assembly 2, such that the retaining element 34 no longer couples the gasket assembly 30 to the first component 10 following assembly. For example, the retaining member 34 may be configured such that a length of the body portion 34c of the retaining member may be greater than the distance between the counter bore 12 and the counter bore 24, e.g. between an opening of the counter-bore 24 and a bottom of the counter-bore 12. For example, the length of the body portion 34c may be greater than a thickness of the gasket body 32 and the length of the bore 12 together. Hence, when the vehicle assembly is assembled, such that no gaps are present between the first component, the gasket body 32 and the second component, the first flange 34a may protrude out of the counter bore 12. When the retaining element 34 is configured in this way, tightening the fastener 40 may cause the deformable portion to deform, e.g. buckle and/or fracture, from the first state to the second state as the first component 10 is coupled to the second component 12. In the second state, the first flange 34a may be received within the counter-bore 12, e.g. such that the first flange 34a does not protrude outside of the counter-bore 12. Furthermore, when the deformable portion is in the second state, the retaining member may no longer couple the gasket assembly to the first component. For example, the body portion 34c of the retaining element may fracture during assembly of the vehicle assembly 2. Alternatively, the first flange 34a and/or the second flange 34b may fracture and/or may break away from the body portion 34c.

Figure 3:
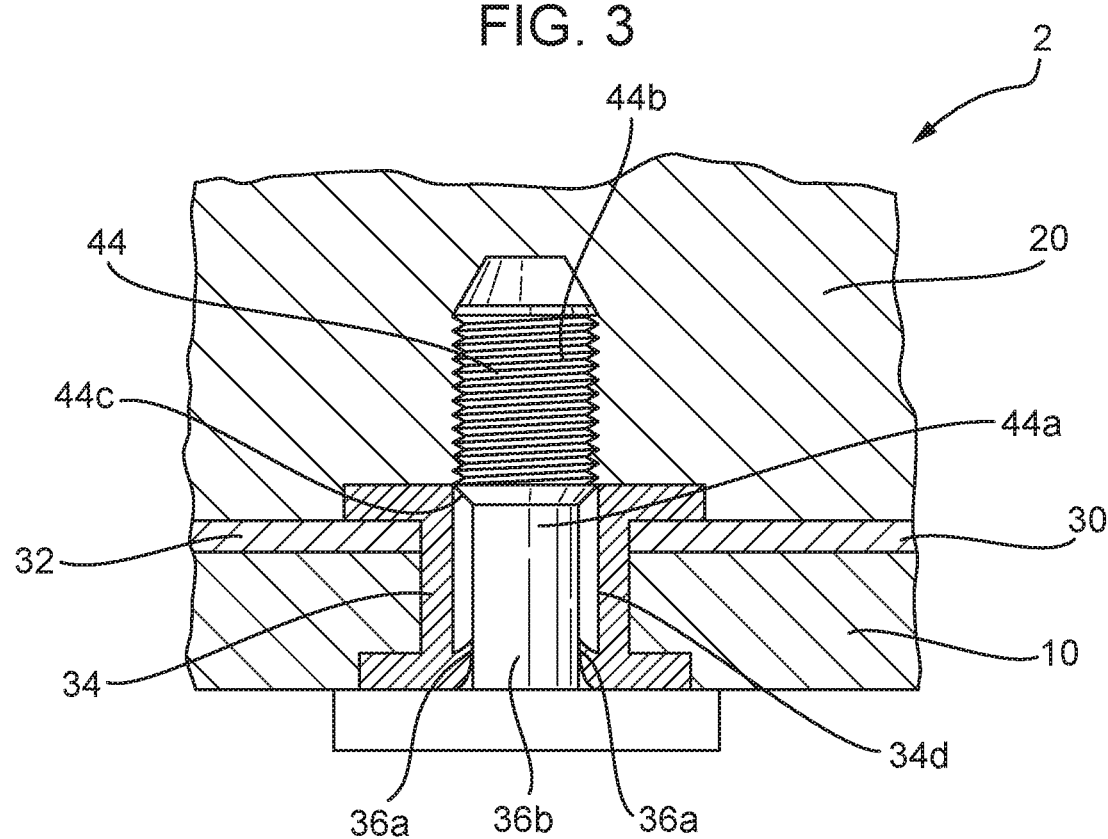
FIG. 3 is a cross-sectional view of a vehicle assembly, according to another arrangement of the present disclosure.

With reference to FIG. 3, the retaining element 34 may optionally comprise one or more grip members 36. The grip members 36 may extend radially inwards from the body portion 34c of the retaining element 34 into the retainer bore 34d. As shown in FIG. 3, the grip members 34 may extend in a direction comprising a component in a direction of a central axis of the retainer bore 34d, e.g. towards the second flange 34b. Grip surfaces 36a may be provided at distal ends of each of the grip members 36. The grip surfaces 36a may at least partially define an opening 36b configured to receive the fastener shank 44. The grip members 36 may be configured to couple to the fastener 40, when the fastener shank is received within the retainer bore.

Figure 4A:
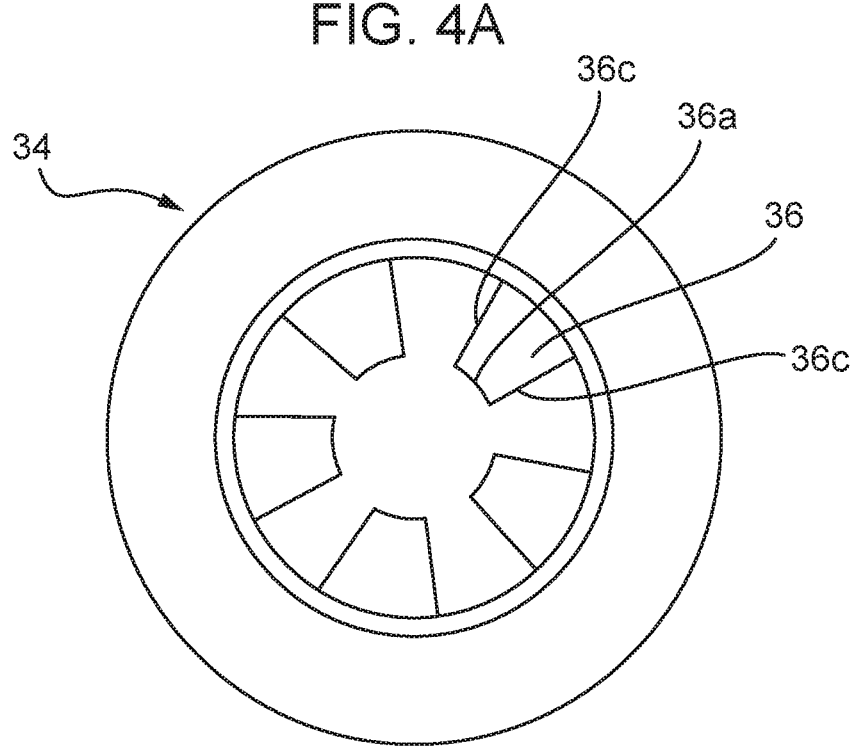
FIGS. 4A and 4B are end views of retaining elements according to arrangements of the present disclosure.

As depicted in FIG. 4A, the retaining element 34 may comprise a plurality of grip members 36. As shown in FIG. 4A, the grip members 36 may be arranged circumferentially about the body portion 34c and may protrude into the retainer bore 34d. The grip members 36 may be separated by circumferentially extending gaps between the grip members 36. As shown in FIG. 4A, sidewalls 36c of the grip members may extend in a substantially radial direction of the retaining element 34.

The grip members 36 may be resilient. When the shank 44 of the fastener is inserted into the opening 36b, the grip members 36 may be deflected in order to allow the fastener 40 to be received within the opening 36b.

Following installation of the shank 44 into the opening 36b, the grip members 36 may grip the fastener 40, e.g. at the grip surfaces 36a, to provide a resistance against its removal. The resistance may be at least partially due to friction between the grip surfaces 36a and the shank 44.

Figure 4B:
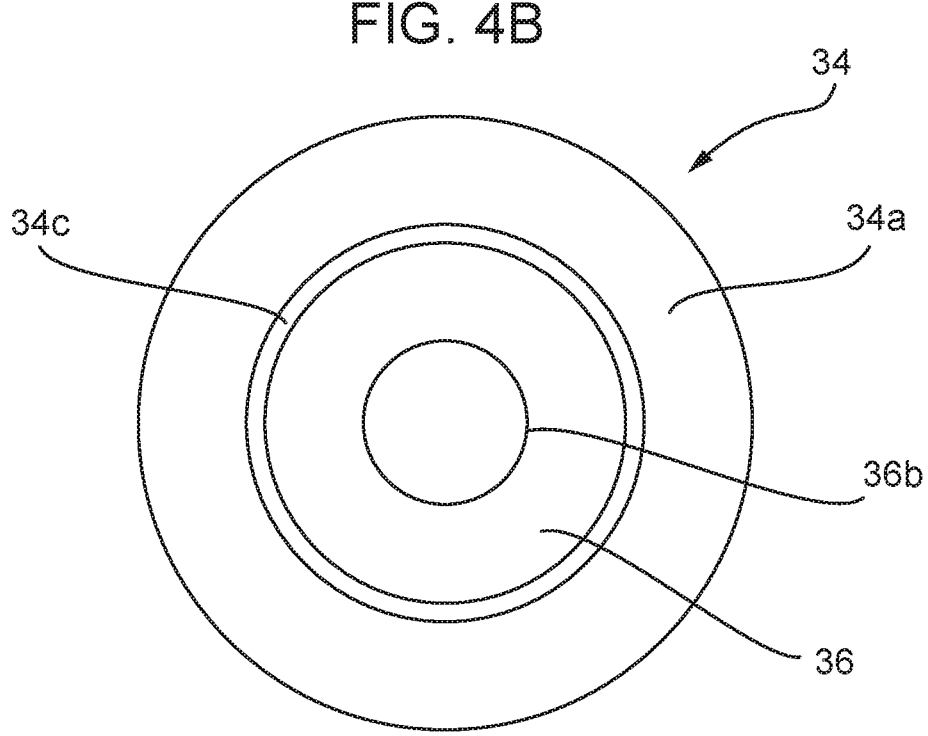

In the alternative arrangement shown in FIG. 4B, a single grip member 36 is provided. The single grip member extends around, e.g. completely around, the circumference of the body portion 34c. The grip member 36 forms a resilient ring that may be deformed in order to allow the shank 44 to be inserted into the retainer bore 34d.

With reference to FIG. 3, a central portion 44a of the shank may have a smaller diameter than a distal portion 44b of the shank. The central and distal portions 44a, 44b of the shank may be separated by a shoulder or lip 44c. As described above, the grip members 36 may be deformed in order to allow the shank 44 to be received within the opening 36b. Once the distal portion 44b of the shank has been received within the opening 36b, e.g. such that the grip members 36 are aligned with the central portion 44a of the shank, the grip members 36a may spring back inwardly, due to their resilient nature, and the grip surfaces 36a may contact the central portion 44a of the shank. The grip members 36 may be positioned to act against the shoulder 44c to resist the removal of the fastener 40 from the retainer bore 34d. The fastener 40 may otherwise be movable, e.g. axially movable, relative to the retaining member 34, e.g. such that the grip members 36 remain aligned with the central portion 44a of the shank.

Figure 5:
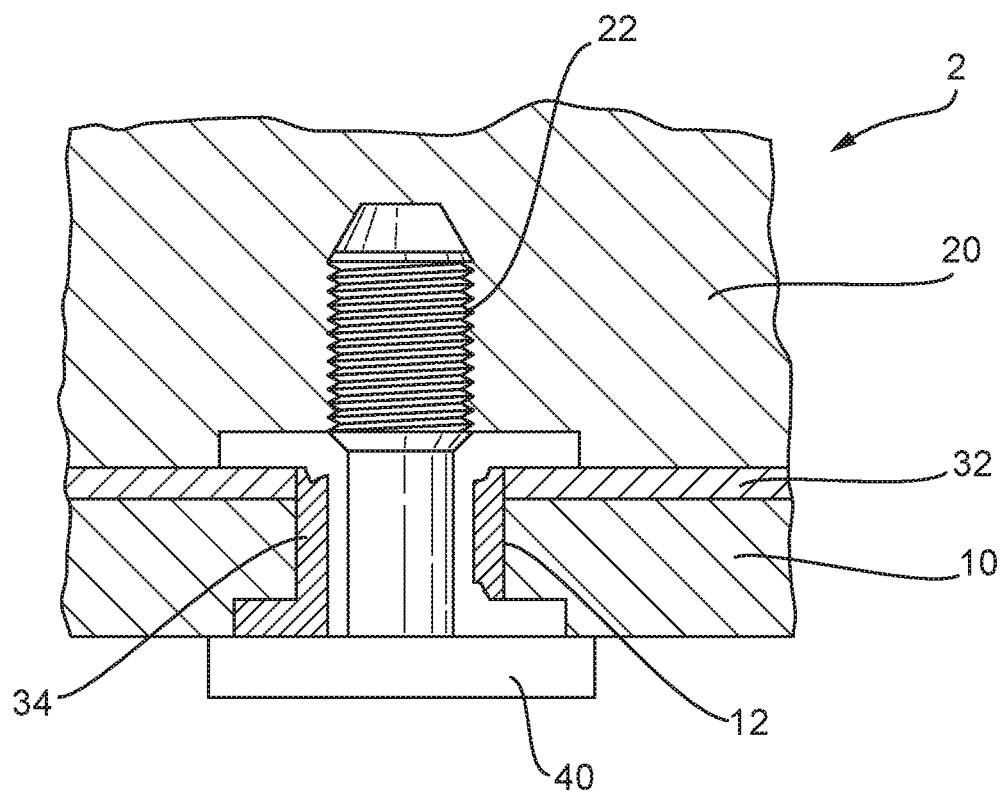
FIG. 5 is a cross-sectional view of a vehicle assembly, according to arrangements of the present disclosure.

With reference to FIG. 3 and FIG. 5, the grip members 36 may comprise, or consist of, a deformable portion. The deformable portion may be configured to deform from a first state, depicted in FIG. 3, to a second state, e.g. as depicted in FIG. 5, during operation of the vehicle assembly, e.g. due to the operating condition of the gasket assembly. When the deformable portion is in the second state, the fastener shank 44 may be readily removed from the retainer bore 34d. When in the second state, the grip members may provide substantially no resistance to the removal of the fastener 40 from the vehicle assembly 2.

The grip member deformable portion may deform due to the operating temperature of the gasket assembly, e.g. the operating temperature of the vehicle assembly in which the gasket assembly is installed. For example, the deformable portion may melt, sublime, evaporate, oxidise and/or decompose, e.g. thermally decompose due to the operating temperature of the gasket assembly.

The grip member 36, or deformable portion may be manufactured from a material having a melting, sublimation, evaporation, oxidation and or decomposition temperature that is less that the operating temperature of the gasket assembly. For example, the grip member, or deformable portion may be manufactured from a polymer material, such as Nylon or polycaprolacone, a wax material, or any other suitable material.

In an alternative arrangement, the grip member deformable portion may be frangible, e.g. breakable, and may be configured to fracture or shatter during operation of the vehicle assembly, such that the grip member no longer couples to the fastener following operation of the vehicle assembly. For example, the deformable portion may be configured to break due to vibrations of the gasket assembly during operation of the vehicle assembly. The deformable portion of the grip member may have a natural frequency of vibration that is substantially equal to a frequency at which the vehicle assembly vibrates during operation.

The deformable portion of the grip member 36 may be configured to deform under substantially the same conditions as the deformable portion of the retaining element 34.

Figure 6:
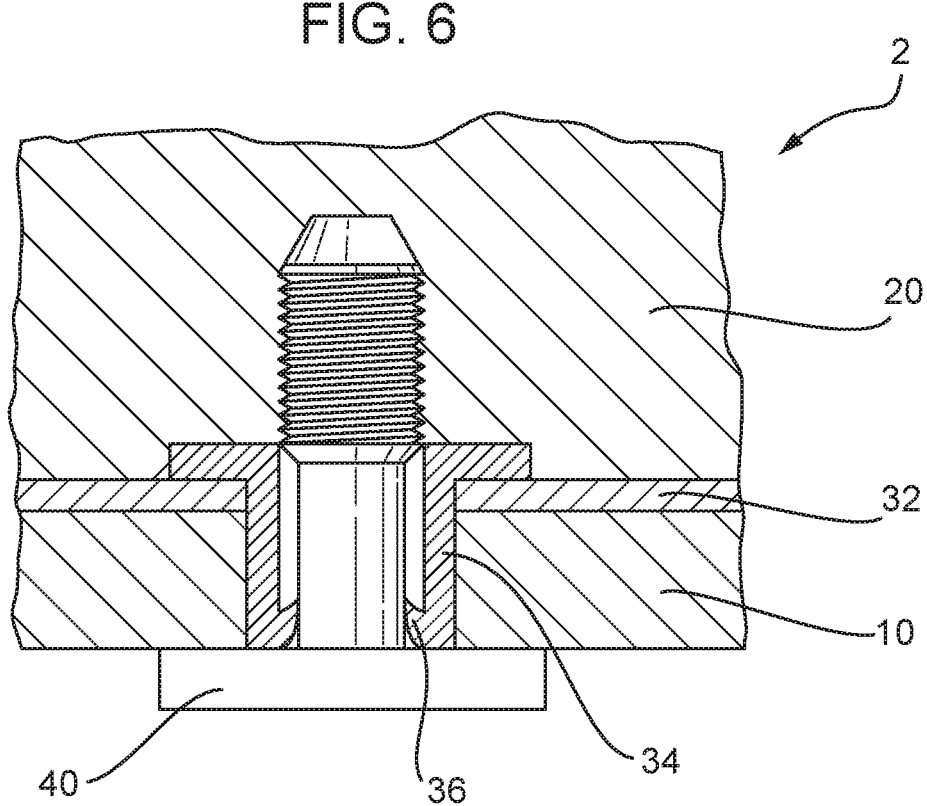
FIG. 6 is a cross-sectional view of a vehicle assembly, according to arrangements of the present disclosure.

With reference to FIG. 6, when the retaining element 34 comprises the grip members 36, the retaining element 34 may be prevented from decoupling from the first component 10 due to the coupling between the grip members 36 and the fastener 40. Hence, when the retaining element 34 comprises the grip members 36, the first flange 34a may be omitted from the retaining element 34.

Figure 7:
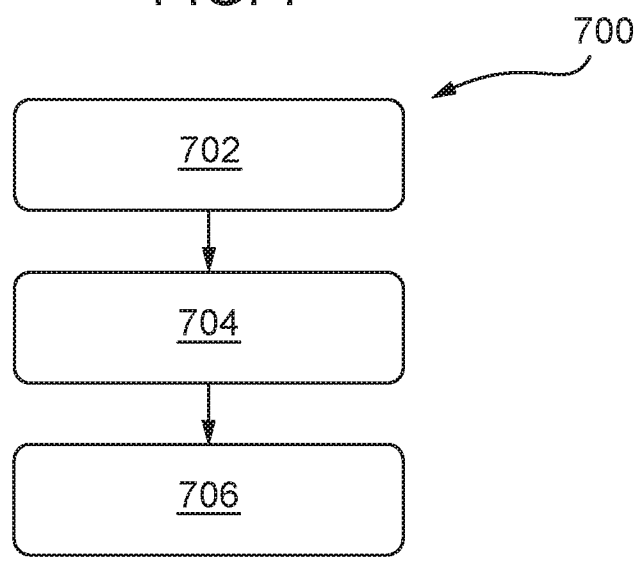
FIG. 7 shows a method of replacing a gasket of a vehicle assembly, according to arrangements of the present disclosure.

With reference to FIG. 7, a method 700 of replacing a replacing a gasket of a vehicle assembly, according to arrangements of the present disclosure, will now be described. The method 700 may be performed when maintaining the vehicle assembly 2 or any other vehicle assembly comprising the gasket assembly 30.

The method comprises a first step 702, in which the vehicle assembly 2 is operated such that the gasket assembly 30 reaches a predetermined operating condition. The predetermined operating condition may be a standard operating condition that the gasket assembly 30 has been designed to operate at within the vehicle assembly 2. Due to operating at the predetermined operating condition, a deformable portion of the retaining element 34 of the gasket assembly 30 may be deformed from the first state to the second state. Hence, the gasket assembly 30 may no longer remain coupled to the first component 10 when the vehicle assembly 2 is disassembled.

In a second step 704 of the method 700, the gasket assembly 30 may be replaced with a replacement gasket. The replacement gasket may not comprise a retaining element.

In some arrangements, the fastener 40 may be a single use fastener. The method may comprise a third step 706, in which the fastener is replaced with a replacement fastener. Alternatively, the original fastener may be re-used.

FIGS. 1A-6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It will be appreciated by those skilled in the art that although the invention has been described by way of example, with reference to one or more examples, it is not limited to the disclosed examples and alternative examples may be constructed without departing from the scope of the invention as defined by the appended claims.

The invention claimed is:

1. A seal assembly for an assembly of a vehicle, the seal assembly comprising:
   a seal configured to create a seal between first and second components of the vehicle assembly; and
   a retaining element configured to couple the seal to the first component prior to assembly of the vehicle assembly, wherein at least a portion of the retaining element is deformable and is configured to deform from a first state to a second state during installation or use of the seal assembly, such that after the deformation the retaining element no longer couples the seal to the first component, wherein the seal defines a seal aperture configured to receive a fastener for coupling the first component to the second component, and wherein the retaining element extends through the seal aperture.

2. The seal assembly of claim 1, wherein the retaining element or portion thereof is configured to deform from the first state to the second state due to an operating temperature of the seal assembly.

3. The seal assembly of claim 1, wherein the retaining element or portion thereof is frangible and is configured to break when the seal assembly is installed into the vehicle assembly.

4. The seal assembly of claim 1, wherein the retaining element is configured to be at least partially received within a bore formed in the first component.

5. The seal assembly of claim 1, wherein the retaining element is configured to extend through a bore defined in the first component.

6. The seal assembly of claim 1, wherein the retaining element defines a retainer aperture configured to receive a fastener.

7. The seal assembly of claim 6, wherein the retainer aperture is aligned with the seal aperture.

8. The seal assembly of claim 1, wherein at least a portion of a grip member is configured to deform between a first state and a second state by virtue of an operating condition of the seal assembly such that the fastener is removed from the seal aperture when the grip member or portion thereof is in the second state.

9. The seal assembly of claim 8, wherein the grip member or portion thereof is configured to deform under substantially the same conditions as the retaining element or the portion thereof.

10. The seal assembly of claim 1, wherein the retaining element is integral with the seal.

11. The seal assembly of claim 1, wherein the retaining element comprises a first flange, a second flange, and a body portion extending between the first and second flanges.

12. The seal assembly of claim 11, wherein the body portion of the retaining element is configured to extend through a bore of the first component such that the first flange is arranged on a first side of the bore and the second flange is arranged on a second side of the bore, and wherein the first flange and/or the body portion is flexible.

13. The seal assembly according to claim 11, wherein the first flange and/or the body portion comprises a plurality of slits configured to reduce a diameter of the first flange.

14. An assembly for a vehicle comprising: a seal assembly with a seal, and a retaining element configured to couple the seal to a first component of the vehicle assembly prior to assembly of the vehicle assembly, wherein at least a portion of the retaining element is deformable and is configured to deform from a first state to a second state during installation or use of the seal assembly, such that after the deformation the retaining element no longer couples the seal to the first component; and wherein the retaining element comprises a first flange, a second flange and a body portion extending between the first and second flanges;
   wherein the vehicle assembly further comprises a second component and a fastener configured to couple the first component to the second component of the vehicle assembly;
   wherein a head of the fastener has a larger diameter than the first flange of the retaining element; and
   wherein the fastener comprises a shank having a mid portion and a distal portion, the mid portion having a smaller diameter than the distal portion, and the mid portion and the distal portion being separated by a shoulder, and wherein the retaining member acts against the shoulder in order to provide resistance against removal of the fastener.

15. The assembly of claim 14, wherein the first component comprises a counter-bore, and wherein the first flange of the retaining element is at least partially received within the counter-bore, and wherein the seal is arranged between the second flange of the retaining element and the first component.

16. The assembly of claim 14, wherein the first component comprises a drain channel configured to allow a melted portion of the retaining element to drain away from the seal, wherein the first component comprises a chamber, the chamber being configured such that the melted portion of the retaining element is received within the chamber, wherein the first component comprises a bore configured to receive a fastener to couple the first component to the second component of the vehicle assembly, and wherein the retaining element is at least partially received within the bore.

17. The assembly of claim 14, wherein the second component comprises a bore configured to receive a fastener to couple the first component to the second component, wherein the second component comprises a counter-bore configured to receive a portion of the retaining element, and wherein the second component comprises a drain channel configured to allow a melted portion of the retaining element to drain away from the seal.

* * * * *